United States Patent [19]

Harrop et al.

[11] 4,094,927

[45] June 13, 1978

[54] PROCESS FOR IMPROVING THE PROCESSABILITY OF POLYOLEFINS, IMPROVED POLYOLEFIN COMPOSITIONS, AND MODIFIER COMPOSITIONS

[75] Inventors: William H. Harrop, Downingtown; David Witiak, Yardley, both of Pa.; Russell A. LaBar, Grafton, Wis.

[73] Assignee: Rohm and Haas Company, Philadelphia, Pa.

[21] Appl. No.: 768,514

[22] Filed: Feb. 14, 1977

Related U.S. Application Data

[63] Continuation-in-part of Ser. No. 587,482, Jun. 16, 1975, abandoned.

[51] Int. Cl.² ................. C08F 2/00; C08L 23/00; C08F 220/04; C08F 4/38
[52] U.S. Cl. ................. 260/897 B; 526/81; 526/216; 526/228; 526/317
[58] Field of Search ............ 260/897 B, 876 R; 526/81, 216, 228, 317

[56] References Cited

U.S. PATENT DOCUMENTS

| | | | |
|---|---|---|---|
| 3,156,743 | 11/1964 | Coover et al. | 260/897 B |
| 3,228,790 | 1/1966 | Sexsmith et al. | 117/138.8 |
| 3,240,552 | 3/1966 | Joyner et al. | 8/39 |
| 3,554,913 | 1/1971 | Gisser et al. | 252/56 |
| 3,694,388 | 4/1972 | Connelly et al. | 260/23 EP |
| 3,764,587 | 10/1973 | Zunker | 526/317 |
| 3,890,292 | 6/1975 | Bohme | 526/240 |

OTHER PUBLICATIONS

Erzin Editor, "Advances in Chemistry", Series 125, ACS, Wash. D.C., 1973.
J. Polymer Science, PTC #8, 161–178, (1965), Billmeyer Lr.

*Primary Examiner*—Herbert J. Lilling

[57] ABSTRACT

An acrylic polymer of one or more $C_{10}$ to $C_{22}$ methacrylates and one or more acrylic acids selected from the group consisting of acrylic acid and methacrylic acid useful as a modifier for polyolefins, the composition comprising polyolefin and a minor amount of the modifier, and a process for improving processability of polyolefin comprising blending therewith the above mentioned acrylic polymer.

9 Claims, No Drawings

PROCESS FOR IMPROVING THE PROCESSABILITY OF POLYOLEFINS, IMPROVED POLYOLEFIN COMPOSITIONS, AND MODIFIER COMPOSITIONS

This application is a continuation-in-part of U.S. Ser. No. 587,482, filed June 16, 1975, now abandoned.

BACKGROUND OF THE INVENTION

This application is related to a previous application by Harrop, Ser. No. 484,840 of July 1, 1974, now abandoned. This invention relates to process for improving polyolefins, novel acrylic processing aids and to improved polyolefin compositions.

Acrylic polymers in general have been suggested as processing aids for polyolefins in the above mentioned Harrop patent application. However some acrylic polymers do not perform as well as others as processing aids.

It is an object of the present invention to provide a method for substantially improving the processability of polyolefins over that previously achieved.

It is a further object of the invention to provide a novel polyolefin composition having improved processability.

Another object of this invention is to provide a novel processing aid for polyolefins.

These, and other objects as will become apparent from the description which follows, are achieved by the present invention which comprises an acrylic polymer of one or more $C_{10}$ to $C_{22}$ methacrylates and one or more acrylic acid selected from the group consisting of acrylic acid and methacrylic acid, a method for improving the processability of polyolefins comprising blending therewith said acrylic polymer, and a composition comprising a polyolefin and said acrylic polymer.

DETAILED DESCRIPTION AND PREFERRED EMBODIMENTS

The polyolefins included in the invention are polymerized from monomers of the general formula

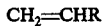

wherein R is H, $C_nH_{2n+1}$ and $n$ is 1 to 4, $C_6H_5$, or $C_6H_4CH_3$. Thus included are high and low density polyethylene, polypropylene, polybutylene, polypentene, polyhexene, polystyrene, and vinyltoluene. The higher molecular weight polyolefins of the unsaturated aliphatic hydrocarbon group wherein R is H or $C_nH_{2n+1}$ as defined above, especially those over 600,000 molecular weight, give the most processing problems absent the modifier of the invention. Processing of polystyrenes having molecular weight from 50,000 to 150,000 is surprisingly and unexpectedly improved using the modifier of the invention.

While any acrylic polymer was previously thought to be useful, the acrylic polymers of one or more $C_{10}$ to $C_{22}$ alkyl methacrylates and one or more acrylic acids selected from the group consisting of acrylic acid and methacrylic acid have been found to be surprisingly and unexpectedly improved to a significant extent over acrylic polymers such as the ones disclosed in the Harrop application, supra. Very much especially preferred are the species wherein the weight ratio of methacrylates to acrylic acid is about 91:9 to 87:13. Examples of the long chain methacrylates found to be useful in the acrylic processing aids of the invention are IDMA(isodecyl), LMA(lauryl), SMA(stearyl), CEMA (cetyl-eicosyl). CEMA is a mixture of cetyl, stearyl, and eicosyl methacrylates.

The preferred acrylic acid in the acrylic polymer is methacrylic acid, but acrylic acid itself and mixtures of acrylic and methacrylic acid can also be used.

It has been discovered that with amounts by weight of acrylic acid in the acrylic polymer of less than about 9 percent, the performance drops off rapidly. Up to about 13 percent acid has been found to perform very well but with 15 percent acid the performance also drops off rapidly.

Preferably the average molecular weight of the acrylic polymer ($\overline{M}_v$) is at least about 100,000 and below about 1,000,000 and is preferably polymerized in a single stage by conventional free radical polymerization.

The acrylic polymer is useful to improve processability of the polyolefins at levels as low as 1% by weight. While there is no upper limit on the levels which increase processability, above 25% is not economically advantageous. Below .1% usually gives too little improvement in processing to be useful.

The compositions of the invention are very suitable for injection molding, film, extrusion, and blow molding. When foams are desired, they can be made by incorporation of a chemical or physical blowing agent and other well known additives such as a particulate nucleating agent and either extruded, injection molded, or compression molded. The addition of the acrylic polymer unexpectedly improves the hot strength and elongation of the polyolefins.

U.S. Pat. No. 3,554,913 to Gisser et al. happens to show copolymers of $C_{14}$ to $C_{22}$ alkyl methacrylates and methacrylic acid, but only in combination with oil as an oil additive for reducing friction between sliding metal surfaces. There is no disclosure of the methacrylate/acid ratios found to exhibit such surprising results in polyolefins as to improving processability.

The following Examples are presented to illustrate a few specific embodiments of the invention. The invention is not intended to be limited thereby. Parts are by weight unless indicated otherwise.

EXAMPLE I

Into a three-neck flask is charged 49.5 parts (by weight) of butyl acetate, 40.2 parts of cetyleicosyl methacrylate and 4.5 parts of methacrylic acid. The solution is heated to 90° C. and sparged with $N_2$ for 15 minutes at a rate of 0.5 SCFH. To the solution is added a total of 0.2 parts of benzoyl peroxide in 3.2 parts of butyl acetate in three equal portions at 0, 1, and 2 hours of reaction time. The reaction is maintained at 90° C. with stirring throughout the reaction. At 5 and 7 hours of reaction time, a total of 0.1 parts of lauroyl peroxide in 2.3 parts of butyl acetate is added in equal portions. The reaction is terminated at the end of 8 hours. The product is isolated by removal of the solvent. The resultant product prepared in this manner gave an estimated intrinsic viscosity at 30° C. in 102% sulfuric acid of 0.25 to 0.35 corresponding to a $M_v$ of 500,000 to 700,000.

EXAMPLE II

To an unmodified polypropylene resin (melt flow 12 g/10 min) is added the ($C_{10}$-$C_{22}$) alkyl methacrylate/methacrylic acid copolymer system, described in Example I, at the 10 phr level. The materials are hand-blended and added to a two-roll mill. The samples are milled at 177° C. for 4 minutes. Table I give the results of the evaluation.

TABLE I
Effect[1] of Acrylic Modifiers[2] on the Processing of Polypropylene

| | Processing | | Processing |
|---|---|---|---|
| Polypropylene | 10 | CEMA (100) | 8 |
| CEMA/MAA (92/8)[3] | 8 | SMA (100) | 8 |
| CEMA/MAA (91/9) | 6 | LMA (100) | 7 |
| (90/10) | 2 | LMA/MAA (90/10) | 4 |
| (89/11) | 2 | SMA/MAA (90/10) | 3 |
| (88/12) | 2 | i-DMA/MAA (90/10) | 3 |
| CEMA/AA (90/10) | 8 | CEMA/i-BoMA (90/10) | 4 |

[1]Best processing = 1; worst = 10
[2]CEMA = cetyl eicosyl methacrylate; SMA = stearyl methacrylate; LMA = lauryl methacrylate; i-DMA = iso-decylmethacrylate; i-BoMA = iso-bornyl methacrylate; MAA = methacrylate acid; AA = acrylic acid
[3]Weight %

EXAMPLE III

To an unmodified polypropylene resin (melt flow 2 g/10 min) is added to CEMA/MAA (90/10) copolymer described in Example I at the 10 phr level. Azobisformamide, a chemical blowing agent at the 0.5–1 phr level is also added. The hand-blended material is extruded on a standard 2–5 cm extruder set at the following temperatures (°C.): Z(1) 188°, Z(2) 210°, Z(3) 221°, and die 182°. The results presented in Table II.

TABLE II
EXTRUDED FOAM DENSITY[1] vs. Extruder Output Rate

| Output Rate (g/min.) | Density Polypropylene (g/cc) | Density Modified PP (g/cc) |
|---|---|---|
| 35 | 0.60 | 0.56 |
| 50 | 0.50 | 0.45 |
| 65 | 0.65 | 0.47 |
| 80 | 0.78 | 0.43 |

[1]All samples have a smooth surface.

EXAMPLE IV

To an unmodified polypropylene resin (melt flow 4 g/cc is added the CEMA/MAA (90/10) copolymer described in Example I at the 10 phr level. The materials are hand-mixed and added to a two-roll mill. Milled stocks are pressed into 20 × 20 × 0.1 cm sheets. A pressed sheet is clamped in a metal holder having a 15 × 15 cm hole. The holder with sheet is supported horizontally in an oven set at 190° C. The sag of the unmodified vs. modified sheets is given in Table III. (No weight was placed on top of the sheet.)

TABLE III
SAG OF POLYPROPYLENE vs. TIME IN OVEN

| Time in Oven (min.) | Polypropylene (cm) | Modified PP (cm) |
|---|---|---|
| 4 | 4.6 | 2.5 |
| 5 | 7.6 | 2.5 |
| 6 | 7.6 | 3.3 |
| 7 | 15 | 6.4 |

EXAMPLE V

The heated sheets described in Example IV are vacuum drawn into a preformed mold. The CEMA/MAA (90/10) modified polypropylene samples exhibited more uniform dimensional stability and flow when compared to the unmodified polypropylene.

EXAMPLE VI

To an unmodified polypropylene resin (melt flow 2 g/cc) is added the CEMA/MAA (90/10) copolymer described in Example I at the 5 phr level. The materials are handmixed and extruded on a standard 2.5 cm extruder equipped with blow molding attachment. Extruded parisons of the modified resin have significantly more dimensional stability and sag reduction when compared to the unmodified polypropylene resin. Bottles with uniform thickness are readily obtained with the modified resin.

EXAMPLES VII AND VIII

These examples illustrate low pressure structural foam injection molding using an acrylic polymer modifier of the invention and a comparative acrylic polymer modifier outside the invention, with polystyrene as the polyolefin. To high impact unmodified polystyrene resin is added the ($C_{10}$-$C_{22}$) alkyl methacrylate/methacrylic acid copolymer system, described in Example I, at the 5 phr level. The mixture was tumble-blended, then extruded using nitrogen as the blowing agent at operating conditions sufficient to obtain a melt temperature of 254°–260° C, then injected onto the mold to form the foamed part. The results, set forth in TABLE IV, show that the molded foam from the polystyrene composition containing the modifier of the invention, Example VII, is characterized by substantially greater change in part weight, that is, density reduction, as compared to the extrudate containing the modifier outside the invention. Further, it is believed that the modifier of the invention affords significant advantages in reducing part cooling time.

TABLE IV

| EXAMPLE | Acrylic Polymer | Inside or Outside Invention | Change in Part Weight |
|---|---|---|---|
| VII | i-DMA/MAA (90/10) | Inside | −9 |
| VIII | i-DMA/MAA (80/20) | Outside | −2 |

We claim:

1. A composition comprising a blend of a polyolefin of the formula $$CH_2=CHR$$

wherein R is H, $C_nH_{2n+1}$ and $n$ is 1 to 4, $C_6H_5$, or $C_6H_4CH_3$, and a minor amount of the acrylic polymer of one or more $C_{10}$ to $C_{22}$ alkyl methacrylates with one or more monomers selected from the group consisting of acrylic acid, methacrylic acid and isobornyl methacrylate wherein the molecular weight ratio of methacrylates to other monomers is about 91:9 to 87:13.

2. The composition of claim 1 wherein the acrylic polymer has a weight ratio of methacrylates to acrylic acid is about 91:9 to 87:13.

3. The composition of claim 2 wherein the methacrylates are a mixture of cetyl, stearyl, and eicosyl methacrylates, the acrylic acid is MAA, and the weight ratio is 90:10.

4. The composition of claim 2 wherein the methacrylates comprise iso-decyl methacrylate, the acrylic acid is methacrylic acid, and the weight ratio is 90:10.

5. The composition of claim 1 wherein the acrylic polymer has a viscosity average molecular weight (Mv) of at least 100,000.

6. The composition of claim 1 wherein the polyolefin is polypropylene.

7. The composition of claim 1 wherein the polyolefin is polystyrene.

8. A process of improving the processability of polyolefins of the formula $$CH_2=CHR$$

wherein R is H, $C_nH_{2n+1}$ and $n$ is 1 to 4, $C_6H_5$, or $C_6H_4CH_3$, comprising blending therewith an acrylic polymer of one or more $C_{10}$ to $C_{22}$ alkyl methacrylates with one or more monomers selected from the group consisting of acrylic acid, methacrylic acid, and isobornyl methacrylate wherein the weight ratio of methacrylates to other monomers is about 91:9 to 87:13.

9. The process of claim 8 wherein the weight ratio of polyolefin to acrylic polymer is about 100:1 to 4:1.

* * * * *